United States Patent
La Rosa

(10) Patent No.: US 9,714,976 B2
(45) Date of Patent: *Jul. 25, 2017

(54) CIRCUIT AND METHOD FOR DETECTING A FAULT ATTACK

(71) Applicant: STMicroelectronics (Rousset) SAS, Rousset (FR)

(72) Inventor: Francesco La Rosa, Rousset (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 168 days.

This patent is subject to a terminal disclaimer.

(21) Appl. No.: 14/599,116

(22) Filed: Jan. 16, 2015

(65) Prior Publication Data

US 2015/0130502 A1 May 14, 2015

Related U.S. Application Data

(63) Continuation of application No. 13/095,432, filed on Apr. 27, 2011, now Pat. No. 8,963,574.

(30) Foreign Application Priority Data

May 3, 2010 (FR) ..................................... 10 53424

(51) Int. Cl.
| | | |
|---|---|---|
| G01R 31/28 | (2006.01) | |
| G06F 21/55 | (2013.01) | |
| G06F 21/75 | (2013.01) | |
| G06F 21/77 | (2013.01) | |
| G11C 11/417 | (2006.01) | |
| G01R 31/40 | (2014.01) | |
| G11C 5/06 | (2006.01) | |
| G11C 11/412 | (2006.01) | |

(52) U.S. Cl.
CPC ........... *G01R 31/282* (2013.01); *G01R 31/40* (2013.01); *G06F 21/552* (2013.01); *G06F 21/554* (2013.01); *G06F 21/75* (2013.01); *G06F 21/77* (2013.01); *G11C 5/06* (2013.01); *G11C 11/412* (2013.01); *G11C 11/417* (2013.01)

(58) Field of Classification Search
USPC .................. 324/764.01, 73.1, 76.11; 725/33; 714/14; 713/189
See application file for complete search history.

(56) References Cited

U.S. PATENT DOCUMENTS

| | | | |
|---|---|---|---|
| 4,538,235 A | | 8/1985 | Henning |
| 4,837,854 A | * | 6/1989 | Oyagi ................... H04B 1/1615 340/7.33 |

(Continued)

FOREIGN PATENT DOCUMENTS

WO   2008/061566 A1   5/2008

OTHER PUBLICATIONS

French Search Report dated Jan. 27, 2011, in corresponding French App. No. 10/53424.

*Primary Examiner* — Vincent Q Nguyen

(74) *Attorney, Agent, or Firm* — Seed IP Law Group LLP

(57) ABSTRACT

A device for detecting a fault attack, including: a circuit for detecting an interruption of a power supply; a circuit for comparing the duration of the interruption with a first threshold; and a counter of the number of successive interruptions of the power supply having a duration which does not exceed the first threshold.

20 Claims, 3 Drawing Sheets

(56) References Cited

U.S. PATENT DOCUMENTS

| | | | |
|---|---|---|---|
| 5,661,359 A * | 8/1997 | Katsuragawa | H02N 2/14 310/316.01 |
| 6,593,766 B1 | 7/2003 | Aisa | |
| 6,745,331 B1 | 6/2004 | Silverbrook | |
| 7,913,274 B2 | 3/2011 | Kendall et al. | |
| 7,962,760 B2 | 6/2011 | Ferren et al. | |
| 2003/0005315 A1 | 1/2003 | Horvat et al. | |
| 2009/0039869 A1 | 2/2009 | Williams | |
| 2009/0065591 A1 | 3/2009 | Paul et al. | |
| 2011/0010775 A1 | 1/2011 | Modave et al. | |
| 2011/0234307 A1 | 9/2011 | Marinet et al. | |

\* cited by examiner

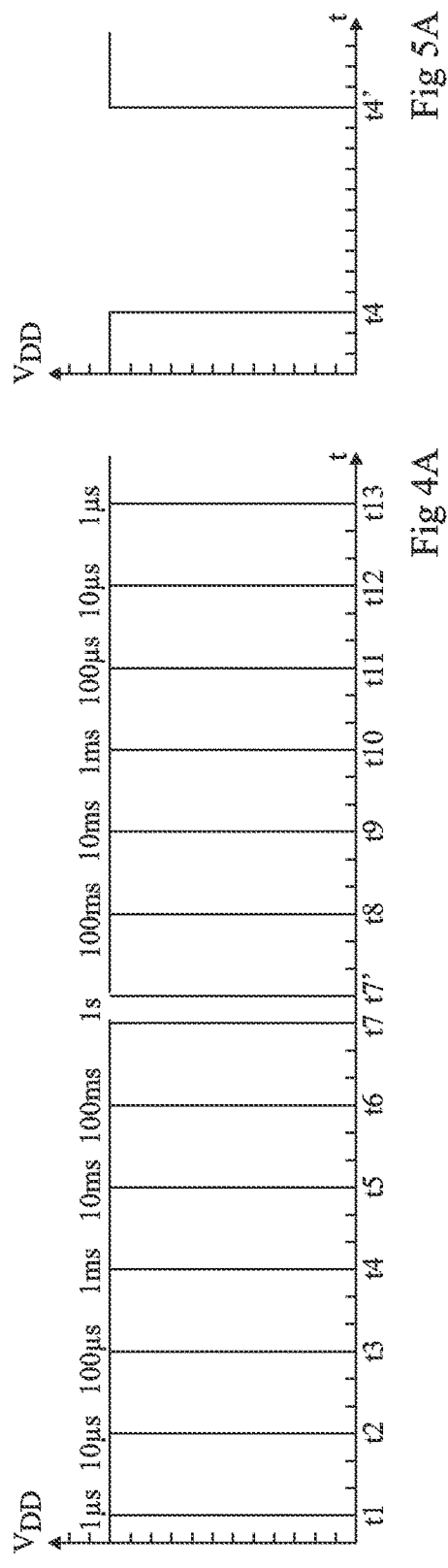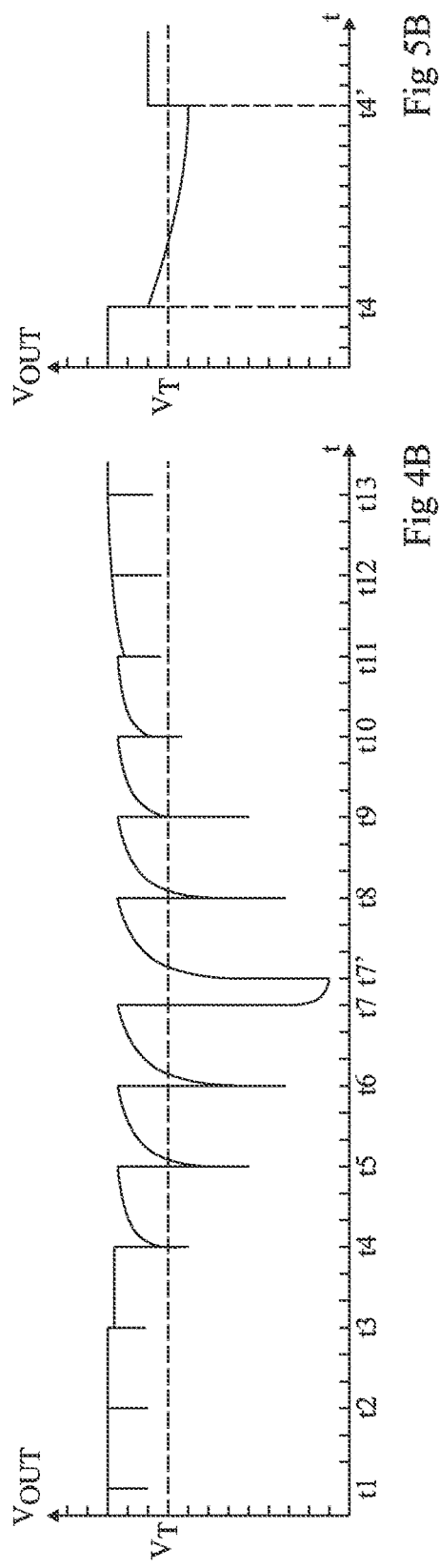

US 9,714,976 B2

CIRCUIT AND METHOD FOR DETECTING A FAULT ATTACK

BACKGROUND

Technical Field

The present invention relates to the field of electronic circuits and of microcircuits embedded in electronic devices. More specifically, the present invention relates to an electronic circuit and to a method for detecting a fault attack on this circuit.

Description of the Related Art

Embedded electronic circuits, and especially microcontroller circuits, for example, chip cards, are often attacked by malicious individuals. Among the known types of attacks, there exist non-invasive attacks, which do not destroy the chip card, and among such attacks, fault attacks. Such attacks are carried out by interrupting the power supply, generally in a sequence of short interruptions of the electronic circuit power supply. Such interruptions are performed at specific times of the circuit operation, and enable to set the circuit to a fault mode, for example, to avoid test steps.

By studying the signals on the electronic circuit responding to such attacks, malicious individuals can reconstruct the program contained in the electronic circuit and, for example, in the case of chip cards, obtain secret data stored in the card, such as cryptographic data or the PIN code of the card.

Currently, no device enables detecting fault attacks where short successive interruptions of the circuit power supply are performed. However, the detection of such attacks could be coupled to an alert or circuit blocking device so that a malicious individual can no longer use the circuit on which attacks have been performed.

There thus is a need for a circuit and a method for detecting, on an embedded electronic circuit such as a chip card, attacks where several successive short interruptions of the circuit power supply are performed.

BRIEF SUMMARY

An embodiment provides an electronic circuit comprising elements for detecting a fault attack carried out on the circuit.

An embodiment provides an electronic circuit comprising elements for detecting a sequence of short interruptions of the circuit power supply.

An embodiment provides a method for detecting a fault attack performed on an electronic circuit capable of being coupled to an alert or circuit blocking process.

An embodiment provides an elementary static memory cell which is quasi non-volatile, that is, insensitive to short interruptions of its power supply.

An embodiment provides a device for detecting a fault attack, comprising: a circuit for detecting an interruption of a power supply; a circuit for comparing the duration of the interruption with a first threshold; and a counter of the number of successive interruptions of the power supply having a duration which does not exceed the first threshold.

According to an embodiment, the counter is automatically reset to zero when the duration of an interruption of the power supply exceeds the first threshold.

According to an embodiment, the device further comprises an alert device when the counter reaches a second threshold.

According to an embodiment, the circuit for detecting an interruption of the power supply comprises, between two terminals of application of a power supply voltage, a MOS transistor having its source, its drain, and its bulk connected together, the gate of the MOS transistor being connected to a first electrode of a capacitor.

According to an embodiment, the circuit for comparing the duration of the interruption with a first threshold comprises a circuit for comparing the voltage across the capacitor with a third threshold.

According to an embodiment, the MOS transistor having its source, its drain, and its bulk connected together comprises a portion forming a gate oxide having a thickness lower than 3 nm.

According to an embodiment, the counter of the number of successive interruptions comprises a set of memory points having their state reset to zero when the duration of an interruption exceeds the first threshold.

According to an embodiment, each memory point comprises: between a first terminal and a second terminal of application of a power supply voltage, a first branch comprising a series connection of a first, of a second, and of a third MOS transistor, the gates of the second and third MOS transistors being connected together, and a second branch comprising a series connection of a fourth, of a fifth, and of a sixth MOS transistor, the gates of the fifth and sixth MOS transistors being connected together; a first capacitor connected between the gate of the first MOS transistor and the second terminal, and a second capacitor connected between the gate of the fourth MOS transistor and the second terminal; and a seventh MOS transistor having its source, its drain, and its bulk connected to the gate of the second MOS transistor and having its gate connected to the gate of the first MOS transistor, and an eighth MOS transistor having its source, its drain, and its bulk connected to the gate of the fifth MOS transistor and having its gate connected to the gate of the fourth MOS transistor.

According to an embodiment, the seventh MOS transistor and the eighth MOS transistor comprise a portion forming a gate oxide having a thickness smaller than the thickness of the gate-oxide-forming portions of the first, second, third, fourth, fifth, and sixth MOS transistors.

An embodiment further provides a chip card comprising a device such as described hereinabove.

An embodiment further provides a method for detecting a fault attack on an electronic circuit, comprising the steps of: detecting an interruption of the circuit power supply; comparing the duration of the interruption with a first threshold; incrementing a counter if the duration of the interruption is shorter than the first threshold and resetting the counter to zero if the duration of the interruption is greater than the first threshold; and comparing the value stored in the counter with a second threshold.

According to an embodiment, the method further comprises a final step of generation of an alert if the value stored in the counter is greater than the second threshold.

An embodiment further provides a static volatile memory cell insensitive to a short interruption of its power supply, comprising: between a first and a second terminals of application of a power supply voltage, a first branch comprising a series connection of a first, of a second, and of a third MOS transistor, the gates of the second and third MOS transistors being connected together, and a second branch comprising a series connection of a fourth, of a fifth, and of a sixth MOS transistor, the gates of the fifth and sixth MOS transistors being connected together; a first capacitor connected between the gate of the first MOS transistor and the second terminal, and a second capacitor connected between the gate of the fourth MOS transistor and the second terminal; and a seventh MOS transistor having its source, its drain, and its bulk connected to the gate of the second MOS transistor and having its gate connected to the gate of the first MOS transistor, and an eighth MOS transistor having its source, its drain, and its bulk connected to the gate of the fifth MOS transistor and having its gate connected to the gate of the fourth MOS transistor.

BRIEF DESCRIPTION OF THE SEVERAL VIEWS OF THE DRAWINGS

The foregoing and other objects, features, and advantages will be discussed in detail in the following non-limiting description of specific embodiments in connection with the accompanying drawings:

FIGS. 4A and 4B respectively illustrate curves of the input voltage and of the output voltage of the circuit of FIG. 3;

FIGS. 5A and 5B respectively illustrate enlargements of the curves of FIGS. 4A and 4B;

For clarity, the same elements have been designated with the same reference numerals in the different drawings.

DETAILED DESCRIPTION

Figure 1:
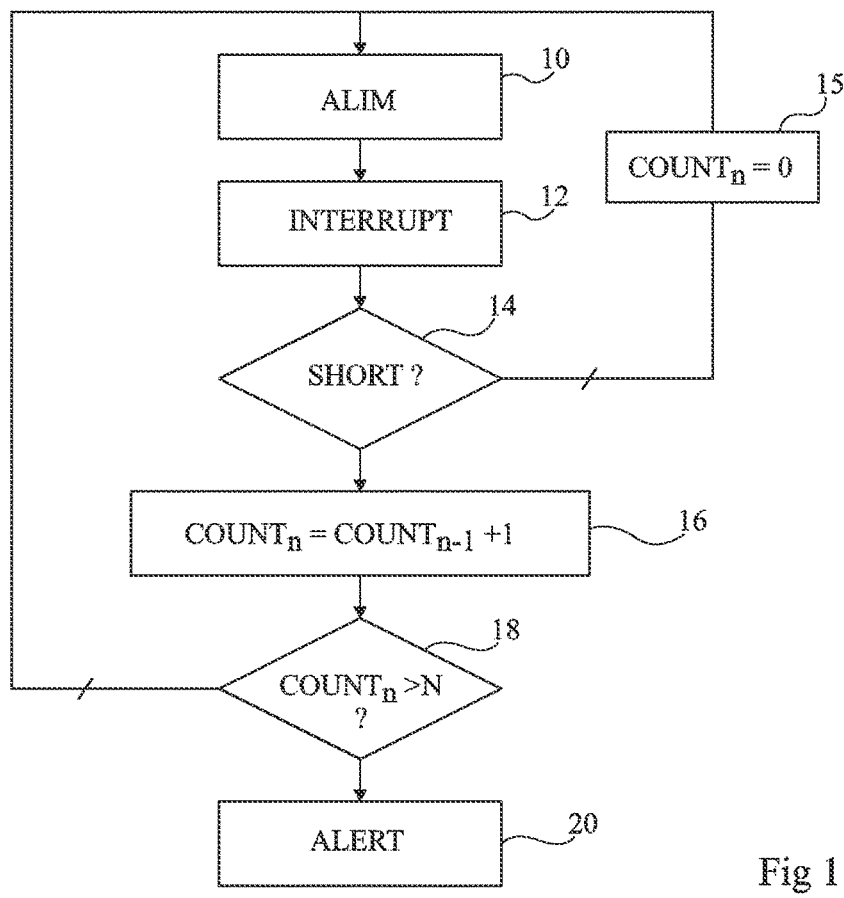
FIG. 1 is a flowchart of a method according to an embodiment.

FIG. 1 is a flowchart illustrating a method for detecting a fault attack performed on a microcontroller electronic circuit, for example, a chip card.

The method of FIG. 1 implements a counter which is initially set to zero. In a first step 10 of the method, the circuit power supply is detected as being active (ALIM). Then, in a second step 12 (INTERRUPT), an interruption of the circuit power supply is detected.

A next step 14 (SHORT?) comprises determining whether the interruption of step 12 is a long or short interruption (with respect to a threshold). If the power supply interruption is a long interruption, the method returns to initial step 10 in which the power supply is reactivated, after having carried out a counter reset step 15 (COUNT$_n$=0). Indeed, if the power supply interruption is long, it may be a purposeful cutting off of the circuit power supply, which should not be detected as part of a fault attack. Thus, the detection device returns to its initial state.

If the power supply interruption is short, the counter is incremented at a step 16 (COUNT$_n$=COUNT$_{n-1}$+1). Then, at a step 18 (COUNT$_n$>N?), the value stored in the counter is compared with a threshold N. If the value stored in the counter is smaller than threshold N, the method returns to initial step 10 where the power supply is reactivated. If the value stored in the counter is greater than threshold N, it is proceeded to a step 20 (ALERT) where an attack alert is emitted, which may, for example, cause the blocking of the electronic circuit (for example, of the chip card). Indeed, the attacks which are desired to be detected are attacks needing several successive short interruptions of the power supply.

Figure 2:
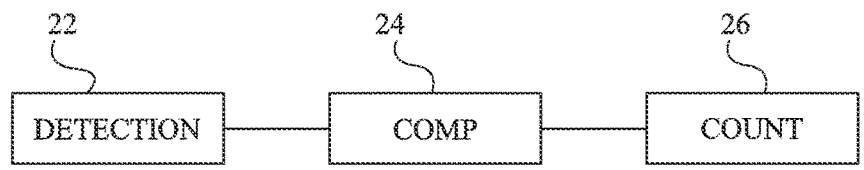
FIG. 2 is a block diagram of a device for detecting fault attacks according to an embodiment.

FIG. 2 illustrates a flowchart of a device capable of implementing the method of FIG. 1.

The device of FIG. 2 comprises a circuit 22 (DETECTION) for detecting an interruption of the power supply of the device associated with a circuit 24 (COMP) for comparing the duration of the power supply interruption with a threshold. The comparison circuit is connected with a counter 26 (COUNT) capable of counting the number of successive short interruptions, the short interruptions being interruptions having a duration shorter than the detection threshold of step 14. As an example, the comparator may be formed of an operational amplifier assembled in differential mode between a voltage provided by detection circuit 22 and a threshold voltage, as will be seen hereafter.

In the rest of this document, the limit between a short or fast interruption and a long interruption will be arbitrarily set to a value on the order of 0.5 ms. It should be noted that by varying the elements forming detection circuit 22 and comparison circuit 24, a limit between what is considered a short interruption and a long interruption may be set to a variable value, for example, a limit ranging between 0.1 and 10 ms, or even of a few seconds.

Figure 3:
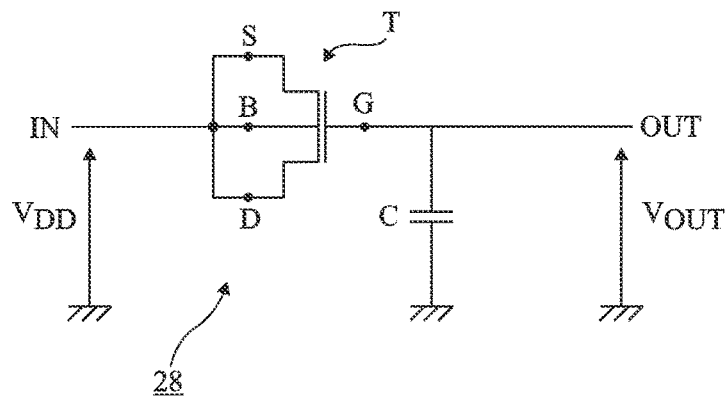
FIG. 3 illustrates a portion of a circuit for detecting a fault attack according to an embodiment.

FIG. 3 illustrates a circuit 28, capable of being used in device 22 for detecting a power supply voltage interruption of FIG. 2.

The circuit of FIG. 3 comprises an input terminal IN capable of being connected to the terminal of application of a positive voltage, $V_{DD}$, for example, the circuit power supply. Input IN is connected to source S, to drain D, and to bulk B of MOS transistor T. Gate G of transistor T is connected to a first terminal of a capacitor C having its second terminal connected to a reference terminal, for example, the ground. Output terminal OUT of the circuit is connected to the first terminal of capacitor C, and output voltage $V_{OUT}$ is taken across capacitor C. Transistor T comprises a gate-oxide-forming region having a thickness of, for example, 3 nm. This enables to take advantage of the direct tunnel effect under the transistor gate.

Advantageously, the present inventor has shown that a transistor having its source, its drain, and its bulk connected and having a sufficiently low gate oxide thickness in the technology used, such as transistor T, behaves as a strongly non-linear resistor of high value, placed between input terminal IN and output terminal OUT (with a low leakage current between the gate and bulk B). For example, for a 1-V voltage $V_{DD}$, transistor T behaves as a resistor on the order of one teraohm. Thus, the circuit of FIG. 3 behaves as a low-pass filter having a very high time constant. It should be noted that the bulk of transistor T should be independent from the ground bulk of the circuit (formed in a well).

FIGS. 4A and 4B respectively illustrate curves of voltage $V_{DD}$ on input IN and of output voltage $V_{OUT}$ of the circuit of FIG. 3, with input voltage $V_{DD}$ exhibiting interruptions of variable duration. FIGS. 5A and 5B respectively illustrate an enlargement, respectively, of a portion of the curves of FIGS. 4A and 4B.

At a time t1, the power supply voltage is interrupted for 1 μs. During this interruption, voltage $V_{OUT}$ on output terminal OUT slightly decreases, then returns to its initial level. At a time t2, respectively t3, the power supply voltage is interrupted for 10 μs, respectively 100 μs. During these interruptions, voltage $V_{OUT}$ on output terminal OUT also slightly decreases, then returns to its initial level.

At a time t4, the power supply voltage is interrupted for 1 ms. FIGS. 5A and 5B illustrate an enlargement of the curves of FIGS. 4A and 4B during this power supply interruption period.

From time t4, and until a time t4' where the power supply is restored, the voltage on output terminal OUT decreases to reach a value smaller than a threshold voltage $V_T$ (in dotted lines in FIGS. 4B and 5B). The same occurs at times t5, t6, t7, t8, t9, t10 where the power supply is respectively interrupted for durations of 10 ms, 100 ms, 1 s, 100 ms, 10 ms, and 1 ms. Then, at subsequent times t11, t12, and t13, the power supply is interrupted again during decreasing time periods shorter than 0.5 ms.

Detection circuit 28 of FIG. 3 is connected to a circuit 24 for comparing voltage $V_{OUT}$ with a threshold voltage, for example, with reference voltage $V_T$. Such a connection enables detecting, in the case of FIGS. 4A, 4B, 5A, and 5B, whether an interruption of a duration longer or shorter than approximately 0.5 ms has occurred. A power supply interruption of a duration shorter than 0.5 ms may correspond to a fault attack.

To detect whether an electric fault attack has been carried out, in addition to the distinction between a fast or slow interruption, it is detected whether a succession of short interruptions of the power supply has occurred. For this purpose, it is provided to count, at step 18, the number of successive short interruptions of the power supply. The counter used to determine this number of interruptions may be of any known type, this counter keeping the data stored during the short power supply interruptions.

Figure 6:
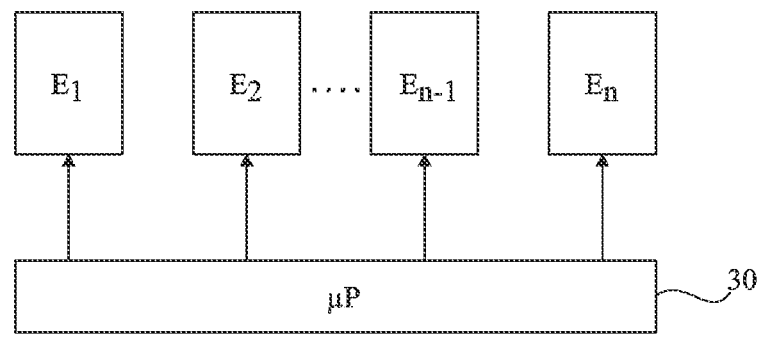
FIG. 6 illustrates a counter according to an embodiment.

FIG. 6 illustrates a counter such as counter 26 of FIG. 2.

The counter of FIG. 6 comprises several elementary memory cells $E_1, E_2, \ldots, E_{n-1}$, and $E_n$ where bits provided to represent the number of successive short interruptions of the power supply will be stored. The number $E_i$ of memory cells is thus selected according to the number of short interruptions of the power supply which is desired to be detected. As an example, the number of successive power supply interruptions which is desired to be detected may be on the order of 100 interruptions.

Each of elementary memory cells $E_1$ to $E_n$ is associated with a calculation device 30, or example, a microprocessor (µP), capable of storing, in memory cells $E_1$ to $E_n$ the number of short interruptions of the power supply. Each elementary memory cell $E_1$ to $E_n$ is a rewritable memory cell insensitive to short interruptions of the power supply, for example based on the cell of FIG. 3.

Figure 7:
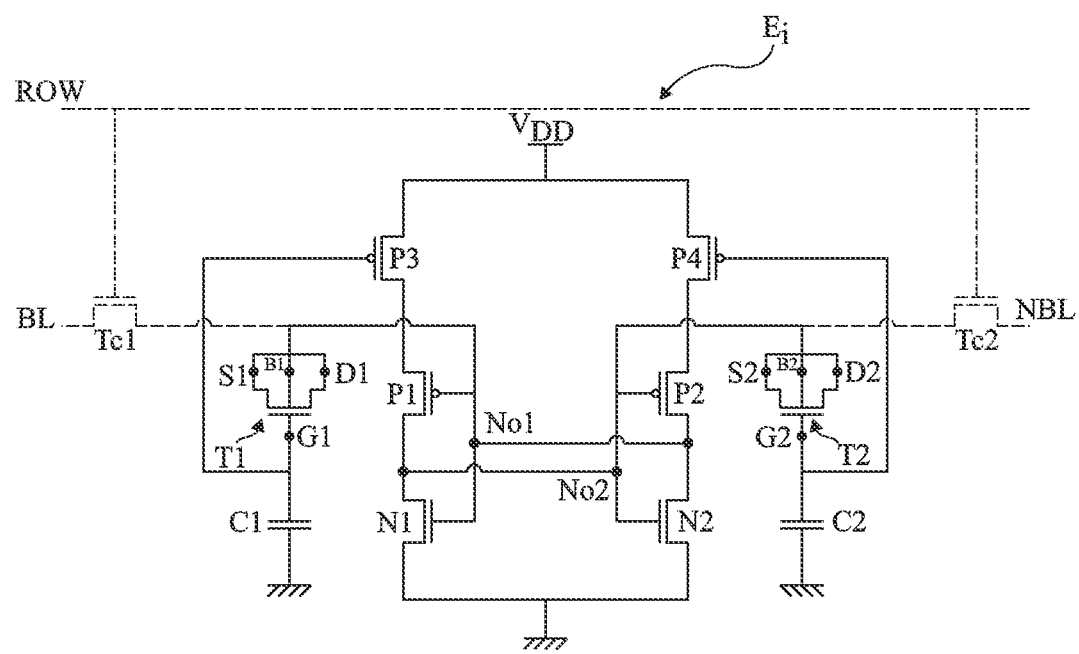
FIG. 7 illustrates an example of an elementary memory cell according to an embodiment, this memory cell being capable of being used in a counter such as that in FIG. 6.

FIG. 7 illustrates an elementary static and quasi non-volatile memory cell for storing a datum $E_i$. This memory cell may advantageously be used in a counter such as counter 26.

The elementary memory cell of FIG. 7 is formed based on a SRAM-type memory cell (Static Random Access Memory), comprising four MOS transistors. It further comprises two additional MOS transistors, as well as two capacitors and two transistors having their source, drain, and bulk connected together.

Between two terminals of application of a power supply voltage, in the example of FIG. 7, a terminal receiving a voltage $V_{DD}$ associated with a power supply and a grounded terminal, two branches, each comprising a series association of two P-channel MOS transistors and of an N-channel MOS transistor are formed. From terminal $V_{DD}$ to the ground, call P3, P1 and N1, respectively, the two P-channel transistors and the N-channel transistor of the first branch and P4, P2 and N2, respectively, the two P-channel transistors and the N-channel transistor of the second branch. The gate of transistor P3, respectively P4, is connected to a first terminal of a capacitor C1, respectively C2, having its second terminal connected to ground.

The gates of transistors P1 and N1, respectively P2 and N2, are connected to the junction point of transistors P2 and N2, respectively P1 and N1. Call No1 the junction point of the gates of transistors P1 and N1 and No2 the junction point of the gates of transistors P2 and N2. A transistor T1, respectively T2, having its source S1, respectively S2, its drain D1, respectively D2, and its bulk B1, respectively B2, connected together, is placed between node No1 and the first terminal of capacitor C1, respectively between node No2 and the first terminal of capacitor C2. Gate G1 of transistor T1, respectively G2 of transistor T2, is connected to capacitor C1, respectively C2.

In the same way as for transistor T of FIG. 3, the gate oxide of transistors T1 and T2 should have a small thickness in the considered technology, smaller than the gate oxide thickness of transistors P1, P2, P3, P4, N1, and N2. This enables for transistors T1 and T2 to behave as non-linear resistors of very high value, and this enables a low current to flow. As an example, the gate oxides of transistors T1 and T2 may have a thickness smaller than 3 nm. Transistors P1, P2, P3, P4, N1, and N2, however, are conventional transistors in the considered technology, with a gate oxide for example having a thickness ranging between 5 and 6 nm (medium-voltage transistors) or greater than 20 nm (high-voltage transistors).

In the cell shown in FIG. 7, transistors P1, P2, N1, and N2 form the basic SRAM cell on which the memory cell is constructed. This portion of the memory cell of FIG. 7 operates like a conventional SRAM cell, that is, it is updated by a signal for setting to the high level or to the low level applied to node No1 or to node No2. As shown in dotted lines, to store a datum in the cell of FIG. 7, node No1, respectively No2, is connected, via a control transistor Tc1, respectively Tc2, to a terminal of application of a line signal BL, respectively NBL, signal NBL being the inverse of signal BL. The gates of the control transistors are connected to a terminal of application of a row signal ROW which enables to turn on the control transistors when it is desired to access to the memory cell of FIG. 7.

Advantageously, in case of a short interruption of the power supply, the use of transistors T1 and T2 enables to maintaining the datum stored in the elementary memory cell of FIG. 7. If a long interruption of the power supply occurs, the datum stored in the memory cell is erased, which automatically implements step 15 of the flowchart of FIG. 1.

Indeed, considering that a logic '1' is stored at the level of node No2, this logic '1' is also stored on the terminal located between transistor T2 and capacitor C2, and capacitor C2 is charged. If an interruption of the power supply occurs, the initially high level on node No2 tends to lower. However, due to the combination between transistor T2 and capacitor C2, capacitor C2 does not immediately discharge (transistor T2 operates as a non-linear resistor of very high value, and thus conducts a low current).

When the power supply is restored, the memory cell balances again since a low state remains stored at node No1, and the datum stored before the interruption is imported back into the memory point, due to the non-zero voltage at the junction point of transistor T2 and capacitor C2.

Thus, by varying the characteristics of transistors P1 to P4, N1 and N2, and T1 and T2, the time during which the data stored in the memory remain stored, when an interruption of the power supply occurs, can be varied. By coupling a power supply interruption detection device such as the device of FIG. 3 with a voltage comparator and a counter formed of elementary cells such as that in FIG. 7, a circuit for detecting a series of short interruptions of the power supply adapted to the detection of a fault attack is obtained.

It should be noted that, as known in devices for detecting attacks on a circuit, counter 26 may be associated with a device blocking the general electronic circuit when an attack is detected so that a malicious person cannot subsequently obtain information relative to the circuit.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A device for detecting a fault attack, comprising:
    a detection circuit configured to detect an interruption of a power supply, the detection circuit having an output and being configured to provide at the output an output signal having a value that depends on a duration of said interruption;
    a comparison circuit having an input coupled to the output of the detection circuit and configured to compare the duration of said interruption with a first threshold; and
    a counter having an input coupled to an output of the comparison circuit and configured to count the number of successive interruptions of the power supply having a duration which does not exceed said first threshold.

2. The device of claim 1, wherein the comparison circuit is configured to automatically reset the counter to zero in response to determining that the duration of an interruption of the power supply exceeds the first threshold.

3. The device of claim 1, further comprising an alert device configured to be activated in response to the counter reaching a second threshold.

4. The device of claim 1, wherein the detection circuit comprises
    a MOS transistor having a source, a drain, and a bulk connected together; and
    a capacitor having a first electrode electrically coupled to a gate of said MOS transistor.

5. The device of claim 4, wherein the comparison circuit is configured to compare a voltage across the capacitor with a second threshold.

6. The device of claim 4, wherein the MOS transistor comprises a gate oxide portion having a thickness lower than 3 nm.

7. The device of claim 1, wherein the counter comprises a set of memory points having states reset to zero when a duration of an interruption exceeds the first threshold.

8. The device of claim 7, wherein each memory point comprises:
    first, second, and third MOS transistors connected between first and second power supply terminals, the second and third MOS transistors having gates connected together,
    fourth, fifth, and sixth MOS transistors connected in parallel with the first, second, and third transistors between the first and second power supply terminals, the fifth and sixth MOS transistors having gates connected together;
    a first capacitor connected between a gate of the first MOS transistor and said second power supply terminal;
    a second capacitor connected between the gate of the fourth MOS transistor and said second terminal;
    a seventh MOS transistor having a source, drain, and substrate connected to the gate of the second MOS transistor and having a gate connected to the gate of the first MOS transistor; and
    an eighth MOS transistor having a source, a drain, and a bulk connected to the gate of the fifth MOS transistor and having a gate connected to a gate of the fourth MOS transistor.

9. The device of claim 8, wherein the seventh MOS transistor and the eighth MOS transistor comprise a gate oxide portion having a thickness smaller than thicknesses of gate oxide portions of the first, second, third, fourth, fifth, and sixth MOS transistors.

10. A chip card comprising:
    a device of configured to detect a fault attack, the device including:
        a detection circuit configured to detect an interruption of a power supply, the detection circuit having an output and being configured to provide at the output an output signal having a value that depends on a duration of said interruption;
        a comparison circuit having an input coupled to the output of the detection circuit and configured to compare the duration of said interruption with a first threshold; and
        a counter having an input coupled to an output of the comparison circuit and configured to count the number of successive interruptions of the power supply having a duration which does not exceed said first threshold.

11. The chip card of claim 10, wherein the comparison circuit is configured to automatically reset the counter to zero in response to determining that the duration of an interruption of the power supply exceeds the first threshold.

12. The chip card of claim 10, further comprising an alert device configured to be activated in response to the counter reaching a second threshold.

13. The chip card of claim 10, wherein the detection circuit comprises
    a MOS transistor having a source, a drain, and a bulk connected together; and
    a capacitor having a first electrode electrically coupled to a gate of said MOS transistor.

14. The chip card of claim 13, wherein the comparison circuit is configured to compare a voltage across the capacitor with a second threshold.

15. The chip card of claim 10, wherein the counter comprises a memory point having states reset to zero when a duration of an interruption exceeds the first threshold.

16. The chip card of claim 15, wherein each memory point comprises:
    first, second, and third MOS transistors connected between first and second power supply terminals, the second and third MOS transistors having gates connected together,
    fourth, fifth, and sixth MOS transistors connected in parallel with the first, second, and third transistors between the first and second power supply terminals, the fifth and sixth MOS transistors having gates connected together;
    a first capacitor connected between a gate of the first MOS transistor and said second power supply terminal;
    a second capacitor connected between the gate of the fourth MOS transistor and said second terminal;

a seventh MOS transistor having a source, drain, and substrate connected to the gate of the second MOS transistor and having a gate connected to the gate of the first MOS transistor; and an eighth MOS transistor having a source, a drain, and a bulk connected to the gate of the fifth MOS transistor and having a gate connected to a gate of the fourth MOS transistor.

17. The chip card of claim 16, wherein the seventh MOS transistor and the eighth MOS transistor comprise a gate oxide portion having a thickness smaller than thicknesses of gate oxide portions of the first, second, third, fourth, fifth, and sixth MOS transistors.

18. A device for detecting a fault attack, comprising:
a detection circuit configured to detect an interruption of a power supply, the detection circuit having an output and being configured to provide at the output an output signal having a value that depends on a duration of said interruption;
a comparison circuit having an input coupled to the output of the detection circuit and configured to compare the duration of said interruption with a first threshold; and
a counter having an input coupled to an output of the comparison circuit and configured to count the number of successive interruptions of the power supply having a duration which does not exceed said first threshold, wherein the counter includes a static volatile memory cell that includes:
first, second, and third MOS transistors connected between first and second power supply terminals, the second and third MOS transistors having gates connected together;
fourth, fifth, and sixth MOS transistors connected between first and second power supply terminals, the fifth and sixth MOS transistors having gates connected together and to a first node between the second and third MOS transistors, and the gates of the second and third MOS transistors being connected to a second node between the fifth and sixth transistors;
a first capacitor connected between a gate of the first MOS transistor and said second power supply terminal;
a second capacitor connected between a gate of the fourth MOS transistor and said second power supply terminal; and
a seventh MOS transistor having a source, drain, and bulk connected to the gates of the second and third MOS transistors and having a gate connected to the gate of the first MOS transistor.

19. The device of claim 18, wherein the counter includes:
an eighth MOS transistor having a source, drain, and bulk connected to the gate of the fifth MOS transistor and having a gate connected to a gate of the fourth MOS transistor.

20. The device of claim 18, wherein the fourth, fifth, and sixth MOS transistors are connected in parallel with the first, second, and third transistors between the first and second power supply terminals.

* * * * *